United States Patent
Heinold et al.

(10) Patent No.: US 9,305,673 B2
(45) Date of Patent: Apr. 5, 2016

(54) SYSTEMS AND METHODS FOR HARVESTING AND STORING MATERIALS PRODUCED IN A NUCLEAR REACTOR

(71) Applicant: GE-Hitachi Nuclear Energy Americas, LLC, Wilmington, NC (US)

(72) Inventors: Mark R. Heinold, San Jose, CA (US); Yogeshwar Dayal, San Jose, CA (US); Martin W. Brittingham, Wilmington, NC (US)

(73) Assignee: GE-Hitachi Nuclear Energy Americas, LLC, Wilmington, NC (US)

( * ) Notice: Subject to any disclaimer, the term of this patent is extended or adjusted under 35 U.S.C. 154(b) by 525 days.

(21) Appl. No.: 13/709,725

(22) Filed: Dec. 10, 2012

(65) Prior Publication Data

US 2013/0177118 A1  Jul. 11, 2013

Related U.S. Application Data

(63) Continuation-in-part of application No. 13/477,244, filed on May 22, 2012, and a continuation-in-part of application No. 13/339,345, filed on Dec. 28, 2011.

(51) Int. Cl.

| | |
|---|---|
| G21B 1/00 | (2006.01) |
| G21G 1/02 | (2006.01) |
| B65D 21/02 | (2006.01) |
| G21C 19/32 | (2006.01) |
| G21F 5/015 | (2006.01) |
| G21F 5/14 | (2006.01) |
| G21C 23/00 | (2006.01) |

(52) U.S. Cl.
CPC .............. *G21G 1/02* (2013.01); *B65D 21/0233* (2013.01); *G21C 19/32* (2013.01); *G21C 23/00* (2013.01); *G21F 5/015* (2013.01); *G21F 5/14* (2013.01)

(58) Field of Classification Search
CPC ............. G21K 5/00; G21K 5/02; G21K 5/08; G21F 5/06; G21F 5/12; G21F 5/14; G21F 2005/125
See application file for complete search history.

(56) References Cited

U.S. PATENT DOCUMENTS

| | | |
|---|---|---|
| 3,940,318 A | 2/1976 | Arino |
| 4,196,047 A | 4/1980 | Mitchem |
| 4,393,510 A | 7/1983 | Lang |
| 4,663,111 A | 5/1987 | Kim |
| 5,910,971 A | 6/1999 | Ponomarev-Stepnoy |

(Continued)

*Primary Examiner* — Marshall O'Connor
(74) *Attorney, Agent, or Firm* — Ryan Alley Intellectual Property Law

(57) ABSTRACT

Systems produce desired isotopes through irradiation in nuclear reactor instrumentation tubes and deposit the same in a robust facility for immediate shipping, handling, and/or consumption. Irradiation targets are inserted and removed through inaccessible areas without plant shutdown and placed in the harvesting facility, such as a plurality of sealable and shipping-safe casks and/or canisters. Systems may connect various structures in a sealed manner to avoid release of dangerous or unwanted matter throughout the nuclear plant, and/or systems may also automatically decontaminate materials to be released. Useable casks or canisters can include plural barriers for containment that are temporarily and selectively removable with specially-configured paths inserted therein. Penetrations in the facilities may limit waste or pneumatic gas escape and allow the same to be removed from the systems without over-pressurization or leakage. Methods include processing irradiation targets through such systems and securely delivering them in such harvesting facilities.

20 Claims, 6 Drawing Sheets

(56) References Cited

U.S. PATENT DOCUMENTS

| | | | |
|---|---|---|---|
| 5,911,332 A * | 6/1999 | Wickland et al. | 220/288 |
| 6,366,633 B1 * | 4/2002 | Stezaly et al. | 376/202 |
| 6,678,344 B2 | 1/2004 | O'Leary | |
| 2004/0105520 A1 | 6/2004 | Carter | |
| 2009/0135983 A1 | 5/2009 | Russell, II | |
| 2009/0213977 A1 * | 8/2009 | Russell et al. | 376/170 |
| 2011/0051872 A1 | 3/2011 | Rickard | |
| 2011/0051874 A1 | 3/2011 | Allen | |
| 2011/0051875 A1 * | 3/2011 | Bloomquist et al. | 376/202 |
| 2011/0216868 A1 | 9/2011 | Russell, II | |
| 2012/0001012 A1 | 1/2012 | Yasuta | |

* cited by examiner

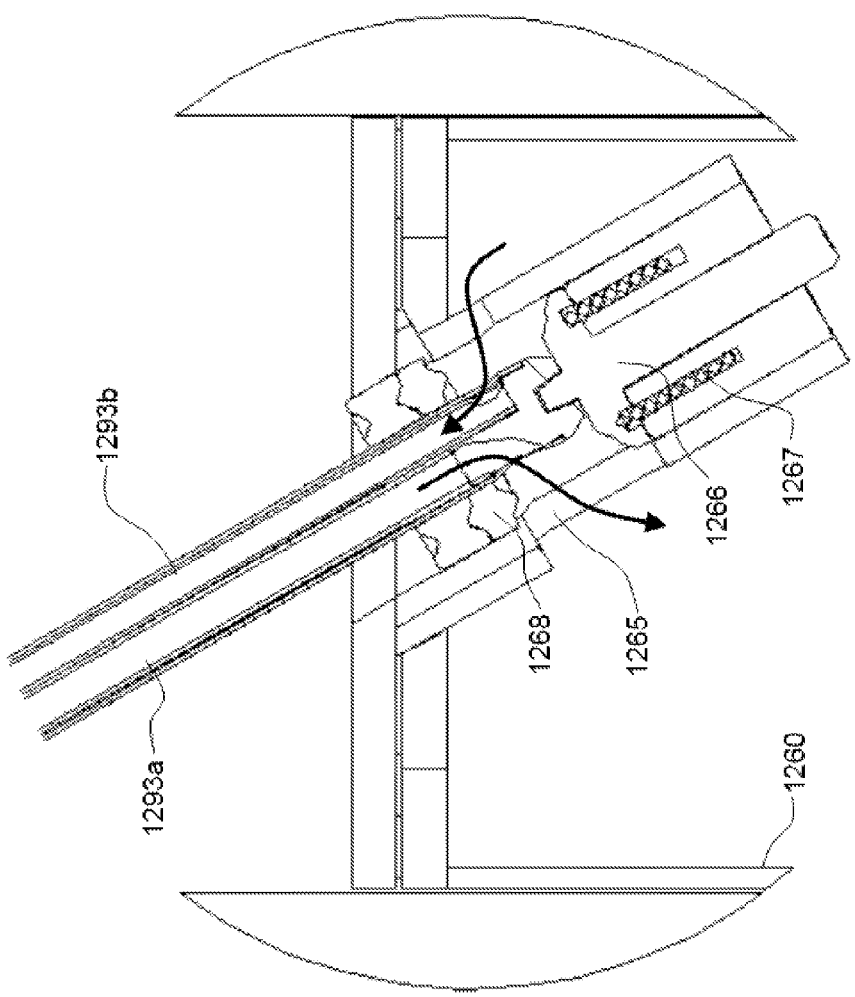

SYSTEMS AND METHODS FOR HARVESTING AND STORING MATERIALS PRODUCED IN A NUCLEAR REACTOR

PRIORITY STATEMENT

This application is a continuation-in-part of, and claims priority under 35 U.S.C. §120 to, co-pending application Ser. No. 13/477,244 filed May 22, 2012, the contents of said application being incorporated by reference herein in their entirety.

GOVERNMENT SUPPORT

This invention was made with Government support under contract number DE-FC52-09NA29626, awarded by the U.S. Department of Energy. The Government has certain rights in the invention.

BACKGROUND

Elements, and specific isotopes thereof, may be formed by bombarding parent materials with appropriate radiation to cause a conversion to desired daughter isotopes. For example, precious metals and/or radioisotopes may be formed through such bombardment. Conventionally, particle accelerators or specially-designed, non-commercial test reactors are used to achieve such bombardment and produce desired isotopes in relatively small amounts.

Radioisotopes have a variety of medical and industrial applications stemming from their ability to emit discreet amounts and types of ionizing radiation and form useful daughter products. For example, radioisotopes are useful in cancer-related therapy, medical imaging and labeling technology, cancer and other disease diagnosis, and medical sterilization.

Radioisotopes having half-lives on the order of days or hours are conventionally produced by bombarding stable parent isotopes in accelerators or low-power, non-electricity-generating reactors. These accelerators or reactors are on-site at medical or industrial facilities or at nearby production facilities. Especially short-lived radioisotopes must be quickly transported due to the relatively quick decay time and the exact amounts of radioisotopes needed in particular applications. Further, on-site production of radioisotopes generally requires cumbersome and expensive irradiation and extraction equipment, which may be cost-, space-, and/or safety-prohibitive at end-use facilities.

SUMMARY

Example embodiments include systems that allow irradiation targets to be irradiated in a nuclear reactor and deposited in a harvestable configuration without direct human interaction or discontinuation of power-producing activities. Example systems include devices that insert and remove irradiation targets through areas that cannot be directly and safely accessed by humans during plant operation via paths that connect to instrumentation tubes in the nuclear reactor inside the access barrier; these systems include accessible endpoints that store desired produced isotopes for handling and/or shipping. The end points can be casks that are securely connected to the system through a sealed channel to prevent migration of waste and/or permit pneumatic forcing of targets through the system and into the casks as well as to exhaust systems that scrub excess gasses for safe release or storage. Example embodiments also include casks with multiple levels of containment that can be breached only for deposition of irradiation targets but otherwise seal. For example, an outer cask can be sealed with a removable cask plug and contain a canister sealed in an internal volume of the outer cask to prevent migration of any matter to an outside of the cask when sealed. Various holes, ports, and/or receptacles in the outer cask and canister can permit only configured irradiation target transport structures to enter these structures and deposit irradiation targets within the cask, while also permitting waste or pneumatic gasses to be removed from the cask without over-pressurization or leakage.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

FIG. 6 is a detail illustration of an example embodiment harvesting cask.

DETAILED DESCRIPTION

Figure 1:
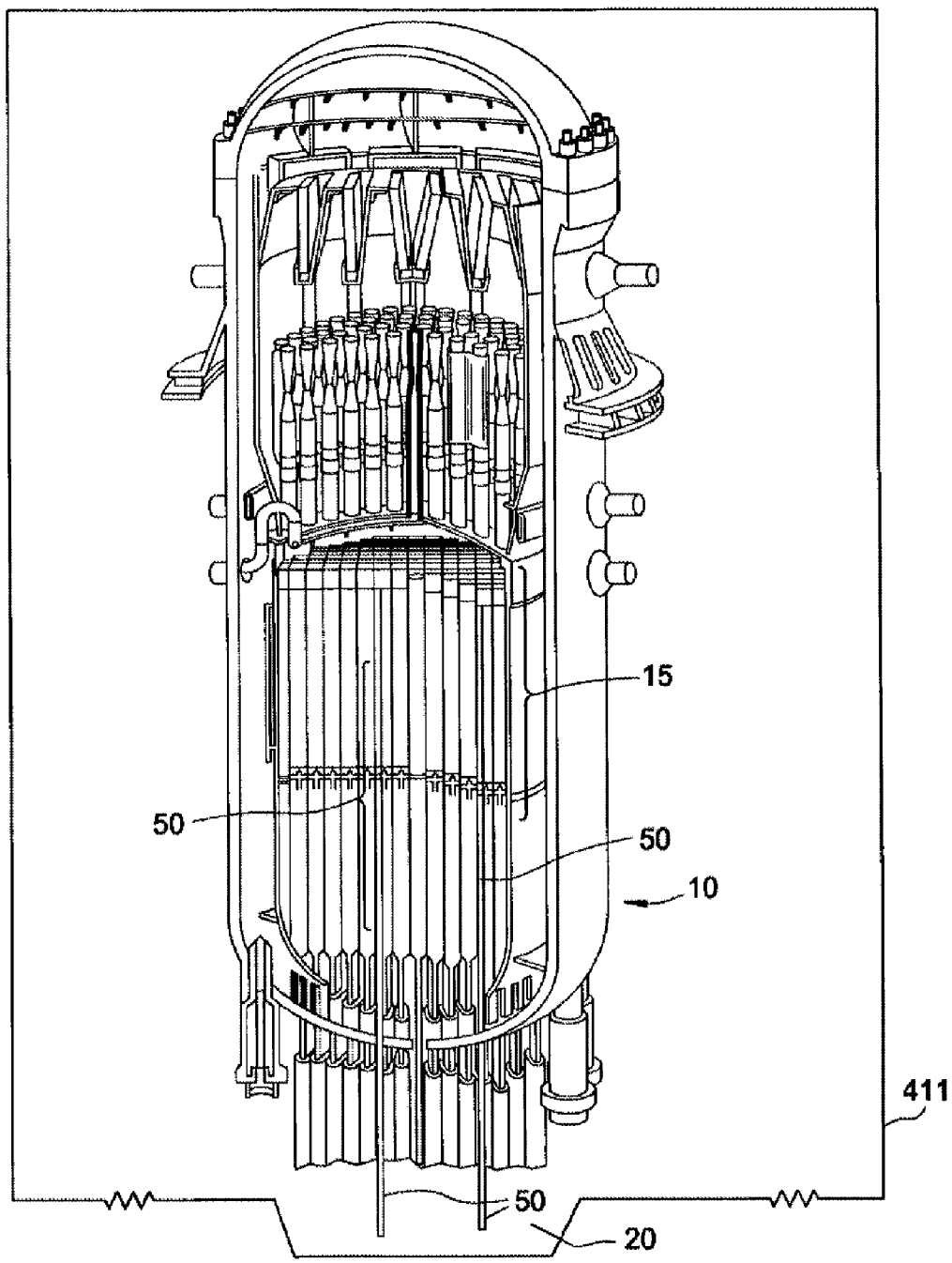
FIG. 1 is an illustration of a conventional commercial nuclear reactor.

This is a patent document, and general broad rules of construction should be applied when reading and understanding it. Everything described and shown in this document is an example of subject matter falling within the scope of the appended claims. Any specific structural and functional details disclosed herein are merely for purposes of describing how to make and use example embodiments. Several different embodiments not specifically disclosed herein fall within the scope of the appended claims; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to in a spatial or physical relationship, as being "connected," "coupled," "mated," "attached," or "fixed," to another element, it can be directly connected or coupled to the other element or intervening elements may be present. In contrast, when an element is referred to as being "directly connected" or "directly coupled" to another element, for example, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that terms like "have," "having," "comprises," "comprising," "includes," and/or "including," when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

FIG. 1 is an illustration of a conventional nuclear reactor pressure vessel 10 usable with example embodiments and example methods. Reactor pressure vessel 10 may be, for example, a 100+MWe commercial light water nuclear reactor conventionally used for electricity generation throughout the world. Reactor pressure vessel 10 is conventionally contained within an access barrier 411 that serves to contain radioactivity in the case of an accident and prevent access to reactor 10 during operation of the reactor 10. As defined herein, an access barrier is any structure that prevents human access to an area during operation of the nuclear reactor due to safety or operational hazards such as radiation. As such, access barrier 411 may be a containment building sealed and inaccessible during reactor operation, a drywell wall surrounding an area around the reactor, a reactor shield wall, a human movement barrier preventing access to instrumentation tube 50, etc.

A cavity below the reactor vessel 10, known as a drywell 20, serves to house equipment servicing the vessel such as pumps, drains, instrumentation tubes, and/or control rod drives. As shown in FIG. 1 and as defined herein, at least one instrumentation tube 50 extends into the vessel 10 and near, into, or through core 15 containing nuclear fuel and relatively high levels of neutron flux and other radiation during operation of the core 15. As existing in conventional nuclear power reactors and as defined herein, instrumentation tubes 50 are enclosed within vessel 10 and open outside of vessel 10, permitting spatial access to positions proximate to core 15 from outside vessel 10 while still being physically separated from innards of the reactor and core by instrumentation tube 50. Instrumentation tubes 50 may be generally cylindrical and may widen with height of the vessel 10; however, other instrumentation tube geometries may be encountered in the industry. An instrumentation tube 50 may have an inner diameter of about 1-0.5 inch, for example.

Instrumentation tubes 50 may terminate below the reactor vessel 10 in the drywell 20. Conventionally, instrumentation tubes 50 may permit neutron detectors, and other types of detectors, to be inserted therein through an opening at a lower end in the drywell 20. These detectors may extend up through instrumentation tubes 50 to monitor conditions in the core 15. Examples of conventional monitor types include wide range detectors (WRNM), source range monitors (SRM), intermediate range monitors (IRM), and traversing Incore probes (TIP). Access to the instrumentation tubes 50 and any monitoring devices inserted therein is conventionally restricted to operational outages due to containment and radiation hazards.

Although vessel 10 is illustrated with components commonly found in a commercial Boiling Water Reactor, example embodiments and methods are useable with several different types of reactors having instrumentation tubes 50 or other access tubes that extend into the reactor. For example, Pressurized Water Reactors, Heavy-Water Reactors, Graphite-Moderated Reactors, etc. having a power rating from below 100 Megawatts-electric to several Gigawatts-electric and having instrumentation tubes at several different positions from those shown in FIG. 1 may be useable with example embodiments and methods. As such, instrumentation tubes useable in example methods may be at any geometry about the core that allows enclosed access to the flux of the nuclear core of various types of reactors.

Applicants have recognized that instrumentation tubes 50 may be useable to relatively quickly and constantly generate short-term radioisotopes on a large-scale basis without interfering with an operating or refueling core 15. Applicants have further recognized a need to generate short-term radioisotopes and remove them from within access barrier 411 quickly, without having to shut down an operating nuclear reactor to access an area within access barrier 411. Example methods include inserting irradiation targets into instrumentation tubes 50 and exposing the irradiation targets to the core 15 while operating or producing radiation, thereby exposing the irradiation targets to the neutron flux and other radiation commonly encountered in the operating core 15. The core flux over time converts a substantial portion of the irradiation targets to a useful mass of radioisotope, including short-term radioisotopes useable in medical applications. Irradiation targets may then be withdrawn from the instrumentation tubes 50, even during ongoing operation of the core 15, and removed for medical and/or industrial use.

Applicants have further recognized a need for a maximized amount of radioisotope production within instrumentation tubes 50, but also identified that such need can be limited by handling and shipping requirements. Produced isotopes can be themselves radioactive or include radioactive contamination from exposure to neutron flux, such that regulatory-approved handling methods and shipping casks must be used in connection with produced isotopes as well as precautions to strip out contamination and off-gasses produced in example systems. The requisite safety, handling, and shipping protocols may require an undue amount of space, add handling delay to harvesting and commercial exploitation, and/or be difficult to implement in access-restricted spaces. Recognizing these problems for mass producing desired isotopes in instrumentation tubes of commercial nuclear reactors, the applicants have developed solutions to these problems, some of which are uniquely enabled by example embodiments discussed below.

Figure 2:
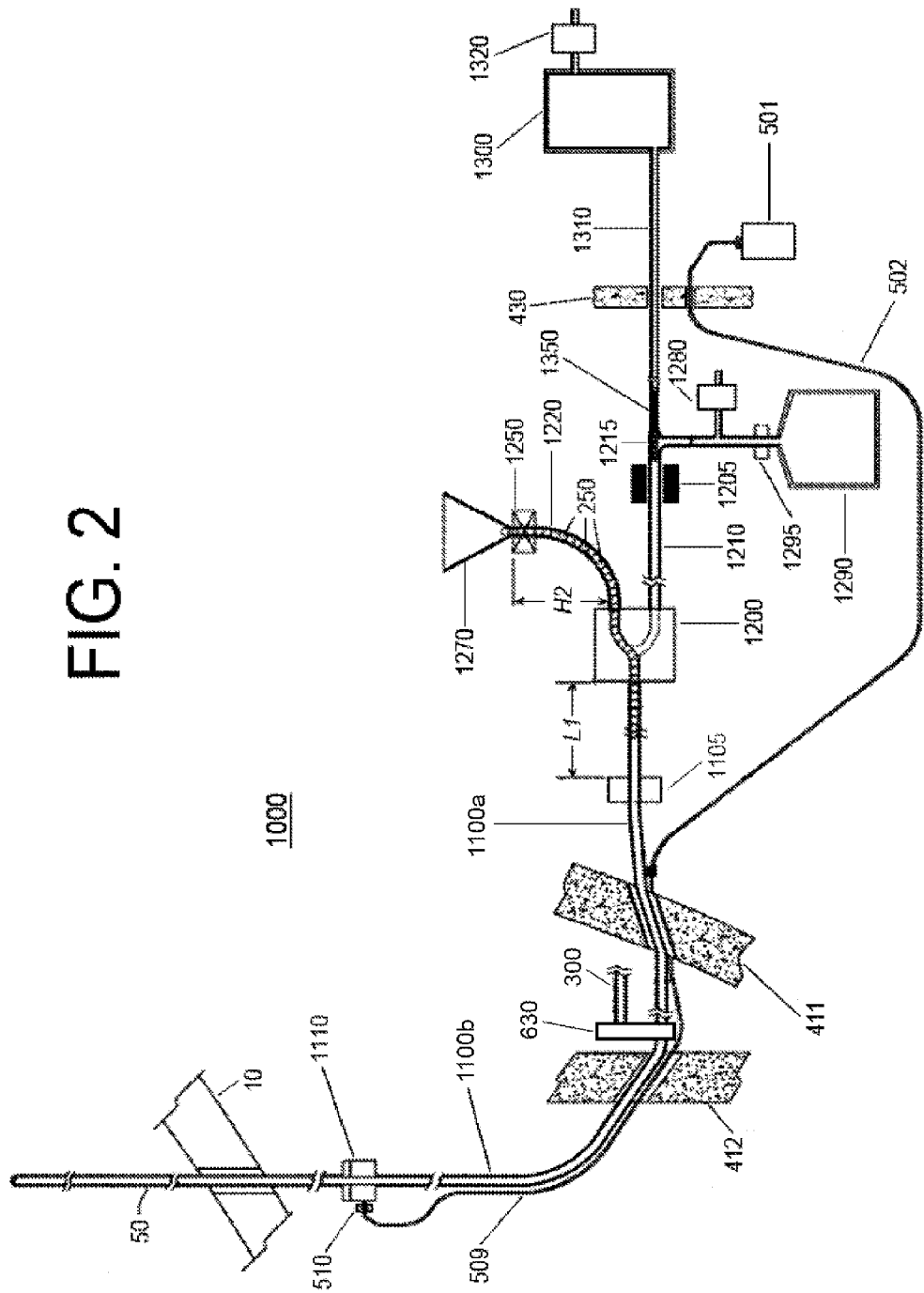
FIG. 2 is an illustration of an example embodiment irradiation target system.

FIG. 2 is a schematic drawing of an example embodiment irradiation target delivery and retrieval system 1000 having a penetration pathway, a loading/offloading system, and a drive system. FIG. 2 illustrates various components of example system 1000 in a loading configuration, another example configuration of which is described in US Patent Publication 2013/0170927, titled "Systems and Methods for Processing Irradiation Targets Through a Nuclear Reactor," filed Dec. 28, 2011, said application incorporated by reference herein in its entirety. As shown in FIG. 2, example embodiment irradiation target delivery and retrieval system 1000 may include or use one or more elements to facilitate irradiation target loading, irradiation, and harvesting in a timely, automatic, and/or consumption-enhancing manner. System 1000 includes a penetration pathway that provides a path from outside access barrier 411 to instrumentation tube 50 for one or more irradiation targets, a loading/offloading system that permits new irradiation targets to be inserted and irradiated targets to be harvested outside access barrier 411, and a drive system that moves irradiation targets between instrumentation tube 50 and loading/offloading in example embodiment system 1000.

A penetration pathway in example embodiment system 1000 provides a reliable path of travel for irradiation targets 250 between an accessible location, such as an offloading or loading area outside access barrier 411 into one or more instrumentation tubes 50, so irradiation targets 250 can move within the pathway to a position in or near an operating nuclear core 15 for irradiation. Example pathways can include many delivery mechanisms used alone or in combination, including tubing, frames, wires, chains, conveyors, etc. in example embodiment system 1000 to provide a transit path for an irradiation target between an accessible location and an operating nuclear core.

Penetration tubing 1100 may be flexible or rigid and sized to appropriately permit irradiation targets 250 to enter into and/or through penetration tubing 1100 and navigate various structures and penetrations in and within access barrier 411. Penetration tubing 1100 may be continuously sealed or include openings, such as at connecting junctions. Penetration tubing 1100 may junction with other tubes and/or structures and/or include interruptions. One possible advantage of penetration tubing 1100 being sealed and securely mating at junctures and/or with any terminal/originating points is that penetration tubing 1100 better maintains pneumatic pressure that can be used for target withdrawal, and also may provide additional containment for irradiation targets 250 and any products formed as irradiation products in example embodiment system 1000.

Penetration tubing 1100 used in example embodiment system 1000 provides a route from an origin at loading junction 1200, where irradiation targets may enter/exit penetration tubing 1100 outside of access barrier 411. As shown in FIG. 2, for example, penetration tubing 1100 leads irradiation targets 250 from loading junction 1200 to access barrier 411, which may be, for example, a steel-lined reinforced concrete containment wall or drywell wall or any other access restriction in conventional nuclear power stations.

Penetration pathways usable in example embodiment system 1000 provide a route through access barrier 411 and to reactor vessel 10 where irradiation targets 250 may enter an instrumentation tube 50. For example, as shown in FIG. 2, penetration tubing 1100 penetrates access barrier 411 and extends to instrumentation tubes 50. Penetration tubing 1100 may pass through an existing penetration in access barrier 411, such as an existing TIP tube penetration, or may use a new penetration created for penetration tubing 1100. Penetration tubing 1100 negotiates or passes through any other objects inside of access barrier 411 before reaching instrumentation tube 50.

An annular reactor pedestal 412 may be present in a drywell 20 beneath reactor 10, and penetration tubing 1100 is shown in FIG. 2 passing through a penetration in pedestal 412. It is understood that penetration pathways may follow any number of different courses and negotiate different obstacles in different reactor designs aside from the specific example path shown with penetration tubing 1100 in FIG. 2. Similarly, penetration pathways need not be consistent or uniform; for example, penetration tubing 1100 may terminate on either side of, and be connected to, a penetration in pedestal 412 to permit irradiation targets 250 to pass through the penetration between penetration tubing 1100.

Penetration pathways useable in example embodiment system 1000 may terminate at or within an instrumentation tube 50. As shown in FIG. 2, penetration tubing 1100 terminates at a flange 1110 at a base of instrumentation tube 50, permitting irradiation targets 250 to pass from penetration tubing 1100 into instrumentation tube 50. Similarly, penetration tubing 1100 may join with an indexer that provides access to several instrumentation tubes 50 from a single penetration through access barrier 411 and/or pedestal 412. Such a system is described in US Patent Publication 2013/0315361 titled "Systems and Methods for Processing Irradiation Targets Through Multiple Instrumentation Tubes in a Nuclear Reactor," filed May 22, 2012, said application incorporated herein by reference in its entirety.

The present invention is directed to systems for producing desired isotopes in nuclear reactors that use a harvesting facility providing automatic/remotely-controllable containment to the produced isotopes for ready handling, shipping, and/or commercialization. Some example embodiments of casks and delivery systems falling within this invention are described below, with the understanding that the specific locations, harvesting structures, delivery path arrangements, and plant types shown in example embodiment systems can be varied across a wide variety of configurations, based on available space, plant operating parameters, isotope properties, regulatory compliance, etc.

Figure 3:
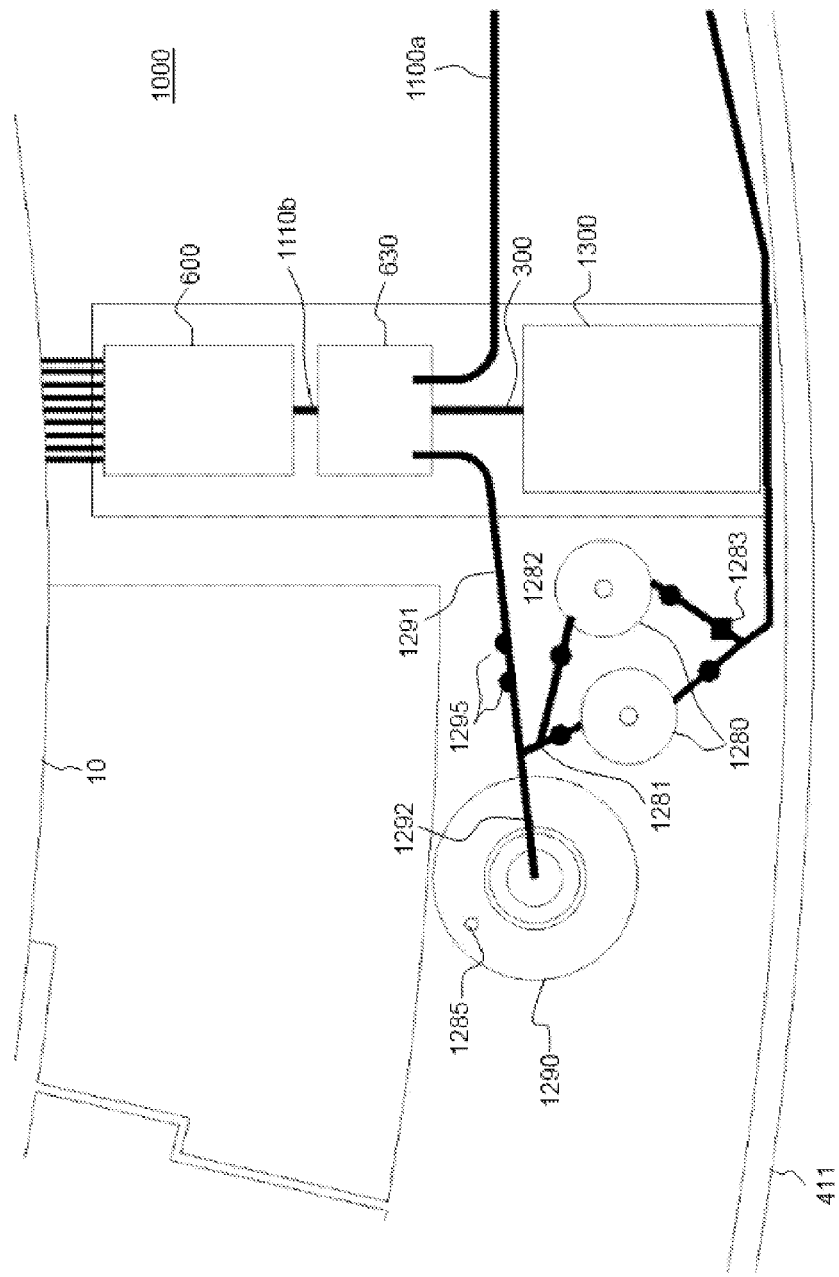
FIG. 3 is an illustration of an example embodiment irradiation target system.

FIG. 3 is an illustration of an example embodiment system 1000 arranged inside of a containment structure for a nuclear plant. As shown in FIG. 3, diverter 630, driving mechanism 1300, indexer 600, and harvesting cask 1290 can all be located just inside of a containment building in the nuclear plant. Penetration pathway 1100*a/b* can provide access through an access barrier 411 in containment and to an instrumentation tube 50 (FIG. 2). In the example embodiment system of FIG. 3, diverter 630 may be a three-way diverter 630, similar to that in US Patent Publication 2013/0177125 titled "SYSTEMS AND METHODS FOR MANAGING SHARED-PATH INSTRUMENTATION AND IRRADIATION TARGETS IN A NUCLEAR REACTOR" filed Dec. 10, 2012, by Heinold et al., which is herein incorporated by reference in its entirety. In FIG. 3, diverter 630 may select between cask tube 1291, TIP tubing 300, and penetration pathway 1100. Cask tube 1291 may function similarly to provide irradiation targets drain produced isotopes through example embodiment system 1000. That is, example embodiment system 1000 may operate similarly to other configurations described in FIG. 2 and in the incorporated documents, except with TIP drive 1300 inside of containment and diverter 630 serving as a loading junction inside access barrier 411, which may be containment.

As shown in FIG. 3, example embodiment irradiation target delivery and retrieval system 1000 may include several harvesting structures and arrangements in addition to harvesting cask 1290 in order to facilitate produced isotope harvesting continuously, with minimal risk or human intervention, and/or in a manner conducive to ready commercialization. For example, structures and arrangements for fail-safe and air-tight deposition of irradiation targets ready for commercial use in a variety of containers can be implemented in connection with example system 1000.

In FIG. 3, cask tube 1291 provides a pathway for irradiated irradiation targets to pass out of diverter 630 and may include one or more counters 1295 that detect an exact number, amount, or activity or irradiated irradiation targets that exit through cask tube 1291, to ensure proper accounting of irradiation target within system 1000 and/or determination of when cask 1290 is nearing fullness.

Cask tube 1291 may include an exhaust line 1281 connected to cask tube 1291 in whole or part. Exhaust line 1281 may allow produced or entrained gas, such as a pneumatic fluid used to drive irradiation targets, to safely exit system 1000 without becoming trapped in or pressurizing harvesting cask 1290. Exhaust line 1281 can include one or more filters 1280; for example, filters 1280 may be high-grade HEPA filters capable of screening out radioactive particulate matter. Exhaust line 1281 may be bifurcated and drawn through two HEPA filters 1280 in parallel as shown in FIG. 3.

Several differential flow gauges 1282 on either side of each filter 1280 may monitor pneumatic exhaust flow and ensure proper flow rates for effective operation of filter 1280. Differential flow gauges 1282 may be coupled or operable with one or more valves 1283 (only one is shown in FIG. 3, but it is understood that multiple flow valves 1283 could be on each segment of exhaust line 1281 on both sides of each HEPA filter 1280). Valves 1283 can be selectively opened or closed to desired degrees to maintain even exhaust flow through each filter 1280 and/or to seal off exhaust line 1281 if necessary, such as in an emergency situation.

Exhaust line 1281 can run outside of example embodiment system 1000 and connect with existing plant exhaust systems (not shown) at atmospheric pressure. In this way exhaust from line 1281 can be filtered of any radioactive particulates by filters 1280 and subsequently processed by plant exhaust system normally.

Cask tube 1291 may include an insertion tube assembly 1292 at its terminal portion where meeting harvesting cask 1290. Insertion tube assembly 1292 may be specially configured to mate with structures in harvesting cask 1290 to ensure reliable delivery of produced isotopes for storage and commercialization in cask 1290. For example, insertion tube assembly 1292 may extend for the final twenty feet of cask tube 1291 and descend downward into harvesting cask 1290 at an angle. Insertion tube assembly 1292 may have separate paths for irradiation targets and exhaust flowing into/out of harvesting cask 1290; for example, insertion tube assembly 1292 may include an exhaust path that flows directly or exclusively into exhaust line 1281 from harvesting cask 1290 to ensure no over-pressurization or buildup of waste gasses in harvesting cask 1290.

Insertion tube assembly 1292 may include a motor, lift, or other automated movement mechanism that can align and engage insertion tube assembly 1292 with harvesting cask 1290 or any other desired end point. For example, insertion tube assembly 1292 may be moved between several different casks 1290 or other end facilities based on contents discharged through example embodiment system 1000. Such movement and selection of destinations may be made automatically or remotely by users controlling a motor in insertion tube assembly 1292.

Figure 4:
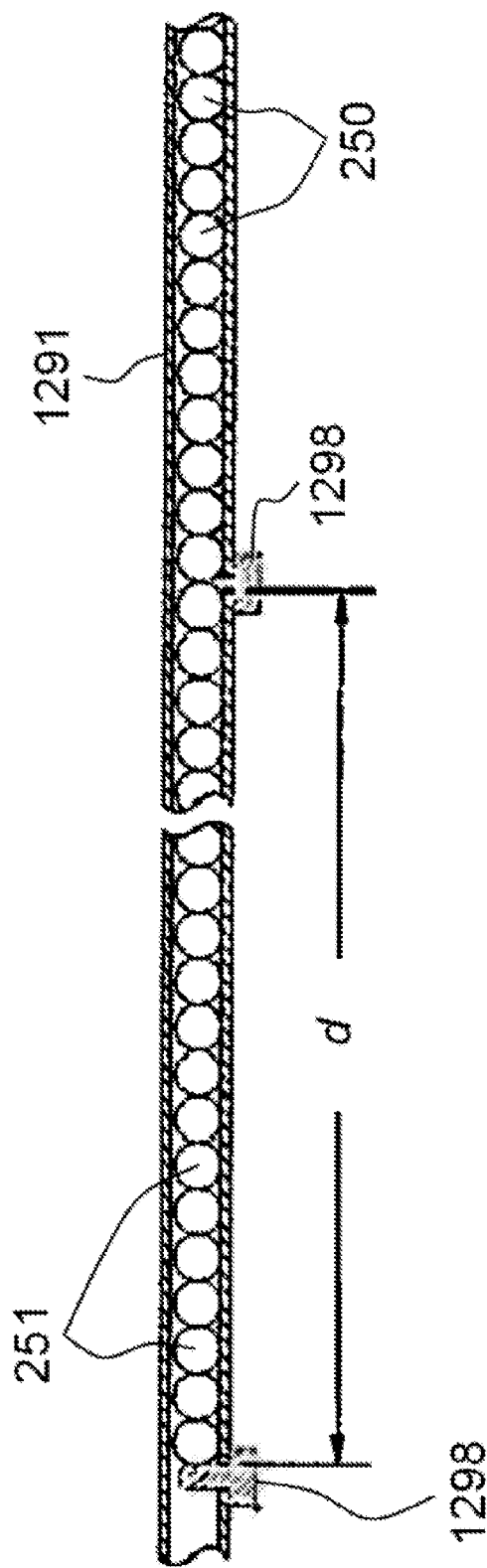
FIG. 4 is an illustration of an example embodiment cask tube.

FIG. 4 is an illustration of an example embodiment cask tube 1291 that may be useable with multiple casks and/or destinations based on target properties. As shown in FIG. 4 one or more stops 1298 may be inserted into cask tube 1291 at desired positions to separate out a certain population of irradiation targets. For example, two stops 1298 may be inserted in cask tube 1291 at a distance d that corresponds to a length of leader spheres 251 used in an example embodiment system 1000 (FIG. 3). Leader spheres 251 may then be emptied out of cask tube 1291 via gravity or pneumatic force into a separate cask or other facility. For example, a motor associated with insertion tube assembly 1292 may align with a leader sphere receptacle, then only the front spacer 1298 and leader spheres 251 may be emptied into this cask, and remaining irradiated irradiation targets 250 may be retained in cask tube 1291 via back stop 1298. Insertion tube assembly may then be directed to harvesting cask 1290 (FIG. 3) and back stop 1298 removed such that irradiation targets 250 can flow to harvesting cask 1290. Of course, other arrangements, distances d, and final destinations for any sub-populations of irradiation targets useable with example systems may be used in connection with example embodiments.

One or more radiation monitors 1285 may be placed on or around harvesting cask 1290 in order to measure radiation levels and indicate if any leakage is occurring from or between harvesting cask 1290 and cask tube 1291. Radiation monitors may also be used in connection with filters 1280 to ensure no leakage or other alarming radioactive buildup at any point through example embodiment system 1000.

Figure 5:
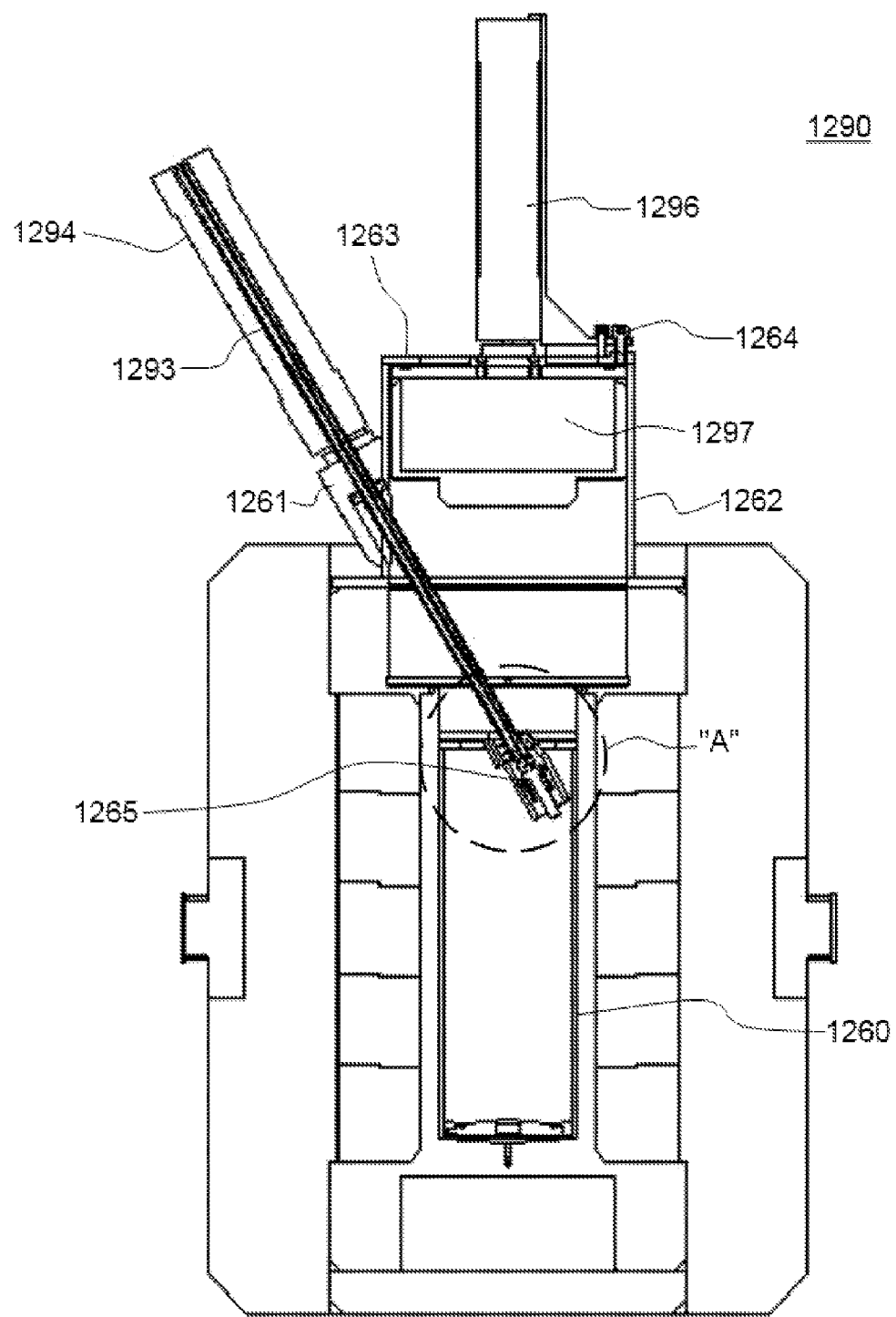
FIG. 5 is a sectional illustration of an example embodiment harvesting cask.

FIG. 5 is a section illustration of an example embodiment harvesting cask 1290. As shown in FIG. 5, insertion tube assembly 1292 (FIG. 3) can include an outer insertion cylinder and one or more linear motors 1294 that surrounds and axially drives an inner insertion tube 1293, in which irradiation targets may be transported for harvesting. Linear motor 1294 may securely mount on an insertion receptacle 1261 of harvesting cask 1290 to extend insertion tube 1293 to a hole dimensioned to receive insertion tube 1293 at a specific angle of attack, permitting reliable insertion as well as aiding movement of irradiation targets therein by gravity.

Insertion tube 1293 has sufficient length and material strength to extend through harvesting cask 1290 and penetrate a harvesting canister 1260 secured within harvesting cask 1290. For example, insertion tube 1293 may pass into a sealable canister port 1265 in a top portion of canister 1260 that is shaped to receive insertion tube 1293 at the angle of attack. Harvesting cask 1290 can be a variety of shapes and sizes, with insertion tube 1293 correspondingly configured to pass into cask 1290 and deposit into a canister therein. Harvesting cask 1290 can include a handle (not shown) or other handling features that permit movement and shipping of harvesting cask 1290. Harvesting cask 1290 may further be modular, with durable sections that house irradiated irradiation targets being removable for shipping without transporting the entire cask 1290. Harvesting cask 1290 and such portions thereof may be fabricated of sufficiently reinforced materials and dimensions to comply with regulatory shipping requirements for radioactive materials, if harvested isotopes are radioactive.

Access to harvesting canister may be selectively available through movement of a cask sealing plug 1297. As shown in FIG. 5, when cask sealing plug 1297 is raised in its open position, insertion tube 1293 may pass to and into harvesting canister 1260 via insertion receptacle 1261 and canister port 1265. If cask sealing plug 1297 is lowered atop harvesting canister 1260 to meet corresponding surfaces of harvesting cask 1290, insertion tube 1261 will be unable to pass beyond insertion receptacle 1261. Cask sealing plug 1297 can be sealed in the lowered position for removal and shipping with canister 1260 and harvestable isotopes stored therein.

Canister 1260 can be any sealed structure capable of safely containing harvestable irradiated irradiation targets in an airtight, atmospheric state. Canister 1260 may seat directly into harvesting cask 1290 as shown in FIG. 5, and be removable therefrom for harvesting at desired end facilities. Harvesting may be accomplished in several ways; for example, a bottom of canister 1260 may be angled and detachable through rotation from the remainder of canister 1260, permitting ready removal of irradiation targets therein through such a bottom.

Canister 1260 includes a sealable mechanism for receiving irradiation targets while maintaining a seal and without direct human interaction. For example, canister port 1265, circled in Detail A of FIG. 5, can provide such sealable entry for irradiated irradiation targets into canister 1260. Once canister 1260 is filled with desired produced isotopes in automated system 1000 and sealed within cask 1290, cask 1290 can be readily cabled or rolled on tracks through a personnel hatch in access barrier 411, or otherwise delivered if outside access barrier 411. A transport cart, tug, and/or pallet jack or other moving devices can deliver cask 1260 to a shipping dock. At the dock, cask 1260 can be shipped or prepared for shipping by adding any regulatory-required structures or markers not already present on cask 1260 for shipping.

FIG. 6 is a detail illustration of Section A of canister port 1265 from FIG. 5. As shown in FIG. 6, canister port 1265 can selectively allow solid or liquid irradiation targets to enter canister 1260 from insertion tube 1293a while allowing a driving pneumatic medium or other waste gas to be vented from canister 1260. Canister port 1265 may also provide a seal to canister 1260 except when specifically actuated for filling with insertion tube 1293. For example, insertion tube 1293 may include two distinct passages—a depositing path 1293a and an exhaust path 1293b. The different paths may run side-by-side or concentrically, for example, via two different tubes in insertion tube 1293.

Depositing path 1293a may be sized and otherwise configured to convey irradiated irradiation targets into canister 1260. As shown in FIG. 6, depositing path 1293a may open into canister port 1265, which is itself open to the internals of canister 1260, and harvested irradiation targets may fall, under gravity or a driving pneumatic medium, into canister 1260 as shown by an arrow. Exhaust path 1293b may similarly be in pneumatic communication with an internal volume of canister 1260 opposite where depositing path 1293a opens into canister 1260. Excess gas may flow through canister port 1260 and into exhaust path 1293b, shown by an arrow, to avoid pressurization of canister 1260 and/or accumulation of unwanted waste gasses. Exhaust path 1293b may be exclusively connected to exhaust line 1281 that exhausts to a plant exhaust system at atmospheric pressure, encouraging all gas introduced through depositing path 1293a to flow back out of exhaust path 1293b. Non-gaseous irradiation targets may be unaffected by this pressure differential after being driven into canister 1260, allowing the harvested irradiation targets to remain sealed in canister 1260 while gas is exhausted therefrom.

Canister port 1265 may further include a biased plunger 1266 that is driven by one or more springs 1267 toward a ring-type seal 1268 about an entrance to canister port 1265. When insertion tube 1293 is withdrawn from canister port 1265, such as during shipping and/or non-filling times, springs 1267 may force plunger 1266 up to contact seal 1268 with sufficient force to seal canister 1260 and prevent leakage of gasses or other materials therein during shipping and handling. When insertion tube 1293 is negotiated through cask 1290 (FIG. 5) and into canister port 1265, an end of insertion tube 1293 may drive plunger 1267 down to a base as shown in FIG. 6, opening pathways in canister port 1265 for irradiation targets to flow from depositing path 1293a into canister 1260.

For example, exhaust path 1293b may be slightly longer and narrower than depositing path 1293a and contact plunger 1266 to drive plunger 1266 down into the open position while depositing path 1293a is shorter and open to innards of canister 1260. In this way depositing path 1293 may remain unobstructed and able to rapidly deposit irradiation targets into canister 1260, while exhaust path 1293b can only convey gasses out of canister 1260 through an opening not blocked by plunger 1266. Of course, any other selective biasing mechanisms can be used to depress plunger 1266 against springs 1267 when insertion tube 1293 is ready to deposit irradiation targets for harvest in canister 1260.

As shown in FIG. 5, cask sealing plug 1297 can be withdrawn to permit insertion tube 1293 access to canister port 1265. Although canister port 1265 may be seal-sealing and configured to permit excess gas to flow in a closed path back out of insertion tube 1293 to an exhaust system, hood 1262 may provide a secondary seal to guard against escape of unscrubbed pneumatic gasses or waste gasses in example embodiment systems. Hood 1262 may be bolted or otherwise removably secured to harvesting cask 1290 about a top where cask sealing plug 1292 may enclose harvesting cask 1290.

As shown in FIG. 5, cask sealing plug 1297 may seat within hood 1262 and be drawn through a top opening of hood 1262 by a cask plug lift 1296. Cask plug lift 1296 may include several redundant motors supported from hood 1262 that are configured to securely join to and precisely and without fail lift and lower cask sealing plug 1292 with necessary force. Cask plug 1297 may seat against a continuous flange 1263 in a top of hood 1262 to provide a secondary barrier to any material that may escape from canister 1260, cask 1290, and/or insertion tube 1293 during delivery of irradiated irradiation targets to harvesting cask 1290. Flange 1263 may include an elastic seal material around its entire lower surface to enhance air-tightness between flange 1263 and cask sealing plug 1292.

Hood 1262 may further include one or more stop pins (not shown) extending inward from its perimeter to block and hold cask plug 1297 in the event of cask plug lift 1296 failing. For example, a pair of opposite stop pins may be engaged when cask sealing plug 1297 is drawn against flange 1263 just below a bottom of cask plug 1297; these pins may reduce any risk that cask plug 1297 may fall and crush insertion tube 1293 during insertion and delivery. Further, one or more adjustment screws 1264 on top of flange 1263 may provide a desired amount of clearance or pressure between cask plug 1297 and flange 1263 by setting a maximum level that cask plug lift 1296 can raise cask plug 1297. Hood 1262 may further include its own exhaust vent (not shown) that flows into exhaust line 1281 or filters 1280 to eliminate any buildup of gasses that may escape into hood 1262 but be unable to escape past the secondary seal formed by plug 1297 and flange 1263.

Insertion receptacle 1261 may provide a passage through hood 1262 at a specific angle and orientation of insertion tube 1293. Insertion receptacle may be sized to receive insertion tube 1293 without leakage from hood 1262; for example insertion receptacle 1261 may further include an elastic seal or surrounding gasket that permits insertion tube 1293 to pass therethrough with minimized leakage. An angle of insertion receptacle 1261 can match an angle of attack required to actuate canister port 1265 for depositing irradiated targets therein. In this way, only when canister port 1265 and insertion receptacle 1261 are properly aligned and traversed by a properly configured structure like insertion tube 1293 can targets successfully be emptied into canister 1260, preventing accidental or spurious deposits.

In operation, cylinder and motor 1294 may align with insertion receptacle 1261 such that insertion tube 1293 is aligned with an opening in insertion receptacle 1261. Cask plug lift 1296 can attach to, or may be already secured to, case sealing plug 1297 on a top of harvesting cask 1290, and cask plug lift 1296 may then lift cask plug 1297 up to flange 1263 of hood 1262. Cask sealing plug 1297 and flange 1263 may then form a seal above canister 1260, stopped at a desired position by adjustment screws 1264, and any desired stop pins or other safety mechanisms can be engaged to avoid accidental dropping of cask plug 1297. Motor 1294 may then drive insertion tube 1293 through insertion receptacle 1261 and down into canister port 1265. Insertion tube actuates canister port 1265, providing sealed a path into canister 1260. Through pneumatic and gravitational forces in example embodiment systems, irradiation targets emptied from reactors where they have been converted into desired daughter products may then flow into canister 1260 through insertion tube 1293. Any undesired gasses can be vented into exhaust lines through a pressure differential.

Once all targets have been deposited in canister 1260, insertion tube may be withdrawn by motor 1294. The withdrawing can seal canister 1260, and cask sealing plug may then be lowered and sealed in cask 1290 following the withdrawal. If canister 1260 is full or has a desired amount of produced isotopes stored therein, as potentially determined by sensors 1295 (FIG. 3), harvesting cask 1290 may be removed from containment and shipped to a particular end facility. Harvesting cask 1290 may be partially deconstructed in this process; for example, only an inner portion of cask 1290 surrounding canister 1260 may be removed and shipped, or harvesting cask 1290 may be removed and shipped if hood 1262 is removed and cask plug lift 1296 disengaged from plug 1297. Each of these actions may be accomplished remotely and without direct human interaction to facilitate minimal entry into containment and radiation exposure.

Example embodiments and methods thus being described, it will be appreciated by one skilled in the art that example embodiments may be varied and substituted through routine experimentation while still falling within the scope of the following claims. For example, the locations, numbers, and dimensions of harvesting casks are not limited to the specific systems shown and described in the figures—other systems using multiple casks outside containment for reliably harvesting irradiation targets are equally useable as example embodiments and fall within the scope of the claims. Furthermore, it is understood that example systems and methods are useable in any type of nuclear plant with access barriers that prevent unlimited access to the reactor, including known light water reactor designs, graphite-moderated reactors, and/or molten salt reactors, as well as any other nuclear plant design. Such variations are not to be regarded as departure from the scope of the following claims.

What is claimed is:

1. A system for delivering and harvesting irradiation targets through a nuclear reactor, the system comprising:
    a loading/offloading system providing irradiation targets, wherein the loading/offloading system is outside of an access barrier of the nuclear reactor;
    a penetration pathway connecting the loading/offloading system to one of a plurality of instrumentation tubes extending into the nuclear reactor inside the access barrier, wherein the penetration pathway is traversable by the irradiation targets to the instrumentation tube; and
    a storage cask connected to the penetration pathway via the loading/offloading system, wherein the storage cask includes,
        an irradiation target receiving facility,
        a removable surface that seals the storage cask and the facility within the storage cask,
        a hood secured about the removable surface, wherein the hood includes a top opening with a flange, and wherein the removable surface and hood are shaped so that the removable surface forms a seal about the flange when drawn up through the hood, and
        an engagement hole, wherein the irradiation target receiving facility can be reached via the engagement hole only when the removable surface is drawn up through the hood and seated against the flange.

2. The system of claim 1, wherein the storage cask is connected to the loading/offloading system via a closed path.

3. The system of claim 1, further comprising:
    an exhaust system configured to clean and vent gas, wherein the storage cask is connected to the loading/offloading system via tubing connected to the exhaust system.

4. The system of claim 3, wherein the exhaust system includes a plurality of filters configured to remove substantially all radioactive particulate matter from a gas flowing through the exhaust system, and wherein the exhaust system is configured to flow the gas to atmospheric pressure.

5. The system of claim 3, wherein the tubing includes a powered moving structure configured to move the tubing among different destinations and to connect the tubing to the storage cask.

6. The system of claim 1, wherein the storage cask is connected to the loading/offloading system via tubing, and wherein the irradiation target receiving facility is sealed inside of and separate from the storage cask.

7. The system of claim 6, wherein the facility includes an engagement port that is self-sealing except when penetrated by the tubing.

8. The system of claim 7, wherein the engagement port includes,
    an opening configured to receive the tubing, and
    a plunger biased against the opening so as to seal the opening except when depressed by the tubing.

9. The system of claim 3, wherein the tubing includes a plurality of distinct paths, wherein a first of the distinct paths is connected to and transports irradiation targets into the facility, and wherein a second of the distinct paths is connected to and transports only gas from the facility.

10. The system of claim 9, wherein the second distinct path further exclusively connects to the exhaust system.

11. The system of claim 7, wherein the engagement hole is sized to receive and seal around the tubing, and wherein the engagement hole is at an angle that matches an angle of the engagement port in the facility such that the tubing will extend in a straight line to engage both the engagement hole and the engagement port.

12. The system of claim 1, wherein the storage cask connects to the loading/offloading system through tubing shaped to pass through the engagement hole.

13. The system of claim 12, wherein the tubing contains a depositing path for the irradiation targets to enter the cask and an exhaust path for venting waste gas from the cask, and wherein the depositing and the exhaust paths are separate tubes.

14. The system of claim 1, wherein the storage cask is outside the access barrier.

15. The system of claim 3, wherein the hood is in pneumatic communication with the exhaust system.

16. A system for delivering and harvesting irradiation targets through a nuclear reactor, the system comprising:
    a loading/offloading system providing irradiation targets, wherein the loading/offloading system is outside of an access barrier of the nuclear reactor;

a penetration pathway connecting the loading/offloading system to one of a plurality of instrumentation tubes extending into the nuclear reactor inside the access barrier, wherein the penetration pathway is traversable by the irradiation targets to the instrumentation tube;

a storage cask connected to the penetration pathway via a tubing to the loading/offloading system such that irradiation targets may be deposited in the storage casks from the instrumentation tube, wherein the storage cask includes, an irradiation target receiving facility sealed inside of and separate from the storage cask, a removable surface that seals the storage cask and the facility within the storage cask when not removed, a hood secured about the removable surface, wherein the hood includes a top opening with a flange, and wherein the removable surface and hood are shaped so that the removable surface forms a seal about the flange when drawn up through the hood, and an engagement hole, and wherein the facility can be reached via the engagement hole only when the removable surface is drawn up through the hood and seated against the flange; and an exhaust system configured to clean and vent gas, wherein the tubing is connected to the exhaust system.

17. The system of claim 16, wherein the exhaust system includes a plurality of filters configured to remove substantially all radioactive particulate matter from a gas flowing through the exhaust system, and wherein the exhaust system is configured to flow the gas to atmospheric pressure.

18. The system of claim 16, wherein the tubing includes a powered moving structure configured to move the tubing among different destinations and to connect the tubing to the storage cask.

19. The system of claim 16, wherein the irradiation target receiving facility includes an engagement port that is self-sealing except when penetrated by the tubing.

20. The system of claim 19, wherein the engagement port includes, an opening configured to receive the tubing, and a plunger biased against the opening so as to seal the opening except when depressed by the tubing.

* * * * *